US008879639B2

(12) United States Patent
Sauerwein, Jr.

(10) Patent No.: US 8,879,639 B2
(45) Date of Patent: Nov. 4, 2014

(54) ADAPTIVE VIDEO CAPTURE DECODE SYSTEM

(75) Inventor: James Timothy Sauerwein, Jr., Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 791 days.

(21) Appl. No.: 13/017,881

(22) Filed: Jan. 31, 2011

(65) Prior Publication Data

US 2012/0194733 A1    Aug. 2, 2012

(51) Int. Cl.
| H04N 7/12 | (2006.01) |
| H04N 11/02 | (2006.01) |
| H04N 11/04 | (2006.01) |
| G06K 7/10 | (2006.01) |
| G06K 7/14 | (2006.01) |
| G08C 21/00 | (2006.01) |

(52) U.S. Cl.
USPC ................. 375/240.25; 235/454; 235/462.06

(58) Field of Classification Search
USPC .................................................... 375/240.25
See application file for complete search history.

(56) References Cited

U.S. PATENT DOCUMENTS

| 6,330,975 | B1 | 12/2001 | Bunte et al. |
| 6,476,863 | B1 | 11/2002 | Silverbrook |
| 6,783,069 | B1 | 8/2004 | Hecht et al. |
| 7,100,830 | B2 * | 9/2006 | Murata et al. ................. 235/454 |
| 7,156,311 | B2 | 1/2007 | Attia et al. |
| 7,348,963 | B2 | 3/2008 | Bell |
| 7,559,472 | B2 | 7/2009 | Silverbrook et al. |
| 7,739,599 | B2 | 6/2010 | Patten et al. |
| 2002/0170970 | A1 | 11/2002 | Ehrhart |
| 2006/0056728 | A1 | 3/2006 | Silverbrook et al. |
| 2006/0238627 | A1 | 10/2006 | Hagiwara et al. |
| 2007/0063050 | A1 | 3/2007 | Attia et al. |
| 2007/0181691 | A1 | 8/2007 | Chang |
| 2009/0078772 | A1 | 3/2009 | Ofek et al. |
| 2009/0135918 | A1 | 5/2009 | Mak-Fan et al. |
| 2009/0213234 | A1 | 8/2009 | Chen et al. |
| 2010/0170951 | A1 | 7/2010 | Silverbrook et al. |
| 2010/0202026 | A1 | 8/2010 | Chiu et al. |
| 2010/0315516 | A1 | 12/2010 | Silverbrook et al. |
| 2011/0068173 | A1 * | 3/2011 | Powers et al. ............ 235/462.06 |

OTHER PUBLICATIONS

May 24, 2012 European Search Report in European Application No. 12153182.6.
Jun. 14, 2012 Communication pursuant to Article 94(3) EPC in European Application No. 12153182.6.
Office Action issued in corresponding European Application No. 12153182.6; Feb. 14, 2014, 5 pages.

* cited by examiner

*Primary Examiner* — Hee-Yong Kim
(74) *Attorney, Agent, or Firm* — Additon, Higgins, Pendleton & Ashe, P.A.

(57) ABSTRACT

Devices, methods, and software are disclosed for an adaptive video capture decode system that efficiently manages a stream of image frames between a device display screen and a processor performing decode attempts on decodable features in the image frames. In an illustrative embodiment, a device assigns frames of image data from a stream of frames of image data to either a display subsystem or a decode subsystem. The display subsystem is operative for rendering the frames of image data on a display screen. The decode subsystem is operative for receiving frames of image data and performing an attempted decode of a decodable indicia represented in at least one of the frames of image data. None of the frames of data are assigned to both the display subsystem and the decode subsystem.

19 Claims, 3 Drawing Sheets

ADAPTIVE VIDEO CAPTURE DECODE SYSTEM

FIELD OF THE INVENTION

The present disclosure relates to digital devices in general and in particular to a digital device having an imaging subsystem.

BACKGROUND

Digital devices having imaging subsystems, such as smart phones, tablet computers, and other formats of mobile computers, may be used for capturing streams image frames having one or more decodeable features, such as characters, words, sentences, and barcodes, for example. A digital device may have a display screen where incoming image signals are presented to a user, at the same time that the device is attempting to decode decodeable features in the images.

The availability of higher density image sensor arrays having an increased number of pixels, while providing certain advantages, can also present challenges. With image sensor arrays having increasing numbers of pixels, frames of image data captured with use of such terminals have increasing numbers of pixel values. While a greater number of pixel values generally allows capture of a frame having a higher resolution, the higher resolution can result in increased processing delays. Image sensor arrays are available in monochrome and color varieties; color image sensor arrays also provide increased data relative to monochrome.

Both rendering the images smoothly and processing the images to perform attempted decodes of decodeable features in the images may pose substantial processing burdens, at the same time, on the processing power available to the device.

The discussion above is merely provided for general background information and is not intended to be used as an aid in determining the scope of the claimed subject matter.

SUMMARY OF THE INVENTION

Devices, methods, and software are disclosed for an adaptive video capture decode system that efficiently manages a stream of image frames between a device display screen and a processor performing decode attempts on decodable features in the image frames. In an illustrative embodiment, a device includes an imaging subsystem, one or more memory components, a display subsystem, a decode subsystem, and a stream parser. The imaging subsystem is capable of providing frames of image data representative of light incident on said imaging subsystem. The one or more memory components are operative for temporarily storing the frames of image data. The display subsystem includes a display screen and is operative for receiving frames of image data and rendering the frames of image data on the display screen. The decode subsystem includes one or more processors operative for receiving frames of image data and performing an attempted decode of a decodable feature represented in at least one of the frames of image data. The stream parser is in communicative connection with the one or more memory components, the display subsystem, and the decode subsystem. The stream parser is operative for assigning a first set of the frames of image data to the display subsystem, and a second set of the frames of image data to the decode subsystem. None of the frames of data are assigned to both the display subsystem and the decode subsystem.

In another illustrative embodiment, a computer-readable storage medium includes executable instructions operative for enabling one or more computing elements, including one or more processors, for assigning frames of image data from a stream of frames of image data to either a display subsystem or a decode subsystem. The display subsystem is operative for rendering the frames of image data on a display screen. The decode subsystem is operative for receiving frames of image data and performing an attempted decode of a decodable indicia represented in at least one of the frames of image data. None of the frames of data are assigned to both the display subsystem and the decode subsystem.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

The drawings are not necessarily to scale or with consistent aspect ratios, emphasis instead generally being placed upon illustrating the principles of various embodiments. In the drawings, like numerals are used to indicate like parts throughout the various views.

DETAILED DESCRIPTION OF ILLUSTRATIVE EMBODIMENTS

Figure 1:
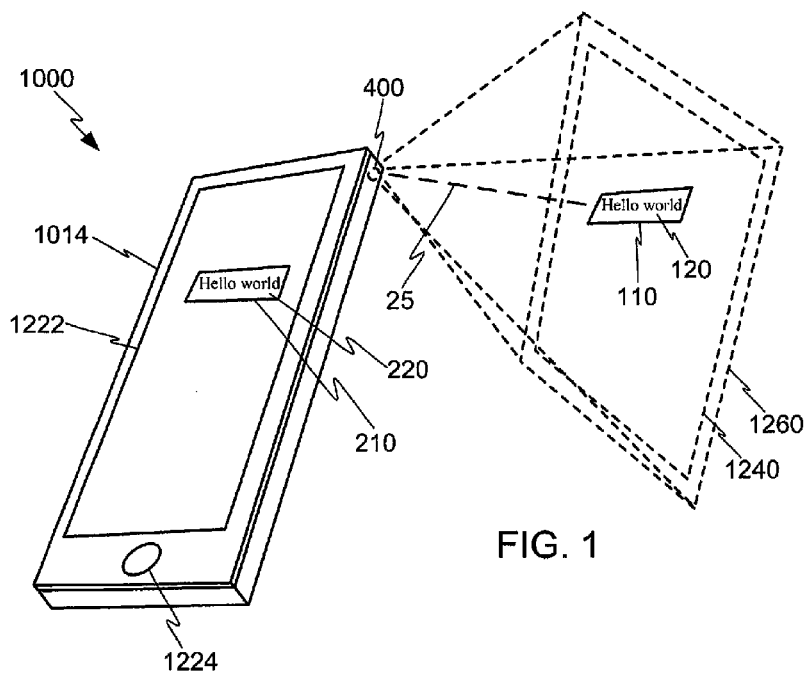
FIG. 1 depicts a perspective view of a digital device with an imaging subsystem and a display subsystem, in accordance with an illustrative embodiment.

FIG. 1 depicts a perspective view of a device 1000 with an imaging subsystem and a display subsystem that includes a display screen 1222, in accordance with an illustrative embodiment. Device 1000 is depicted as a smartphone in FIG. 1, but in various embodiments may take the form of a mobile phone, a hand held mobile computer, a tablet computer, a netbook computer, a laptop computer, an e-book reader, an indicia scanning terminal, or any of a wide range of other types of digital devices with imaging subsystems and display screens in various embodiments. In the illustrative embodiment of FIG. 1, device 1000 includes user interface elements including display screen 1222 and pointer mechanism 1224, disposed on a common side of a housing 1014. Display screen 1222 in one embodiment may incorporate a touch panel for navigation and virtual actuator selection, so that display screen 1222 serves as both user input device and user output device of device 1000. Display screen 1222 and pointer mechanism 1224 in one embodiment perform as user interface elements or user input/output components of device 1000. Various embodiments of device 1000 may also include other keys, a slide-out or fixed keyboard, a trigger, and/or other user input/output components, for example.

FIG. 1 depicts imaging subsystem 400 of device 1000 being used to image a target 110 having a decodeable feature 120. Device 1000 is capturing a stream of image frames of the field of view 1240 of imaging subsystem 400, and processing the image frames for display on display screen 1222, including a rendering of target image 210, an image of target 110, with a rendering of decodeable feature image 220, an image of decodeable feature 120, thereon. Imaging subsystem 400 includes an illumination source that projects illumination field 1260 to surround field of view 1240, in this illustrative embodiment. Decodeable feature 120 is an English phrase written in alphabetic characters, in this example. Other decodeable features may include any type of writing written in any language in any type of characters; numbers, equations, one or two dimensional barcodes of any format or standard, or any other kind of representational symbol.

Figure 5:
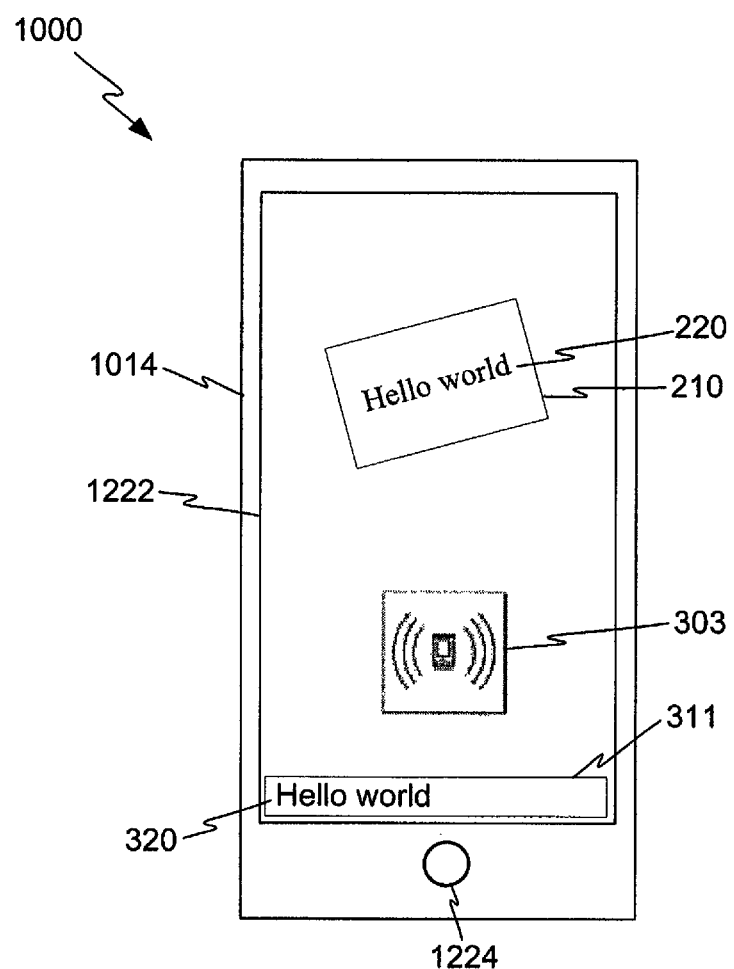
FIG. 5 depicts a top plan view of a digital device with a display subsystem with an imaging application graphical user interface on a display screen, displaying a frame of image data from a stream of image data, a user guidance icon, and information from a successfully decoded decodeable feature from a different frame of image data from the stream of image data.

Device 1000 is operative not only for capturing and displaying targets and decodeable features, but also for performing decodes of the decodeable features and acquiring the information they represent. For example, device 1000 may have a decode subsystem that recognizes the representational format of decodeable feature 120, namely alphabetic letters representing words in the English language, and applies one or more optical character recognition (OCR) processes to acquire the words represented in the text. Other decoding processes may be applied to other forms of decodeable features, such as barcode decoding algorithms to an image of a two-dimensional barcode, or a document capture program for scanning and saving a document, for example. As shown in FIG. 5, device 1000 may render a text box 311 on display screen 1222 that displays the output text 320 representing the decoded information from the decodeable feature 120. The decoded information produced by the successful decode of decodeable features may also be provided in any other format of output, such as a text translation into another language or a text-to-speech audio output, for example.

Figure 2:
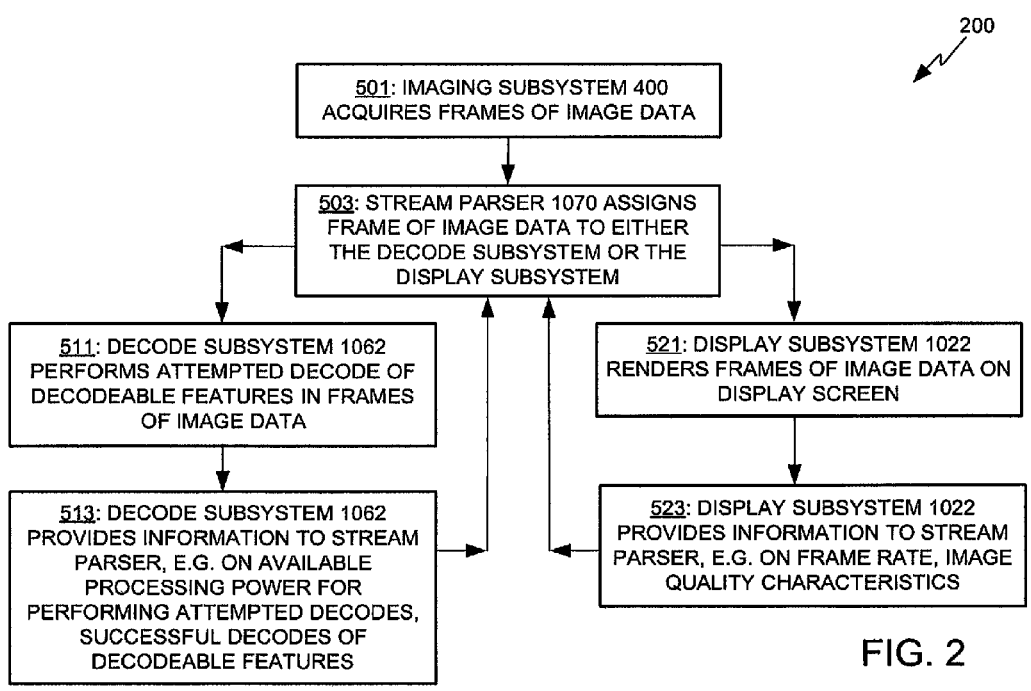
FIG. 2 depicts a flowchart for executable instructions for processing elements including a stream parser in a digital device, in accordance with an illustrative embodiment.
Figure 3:
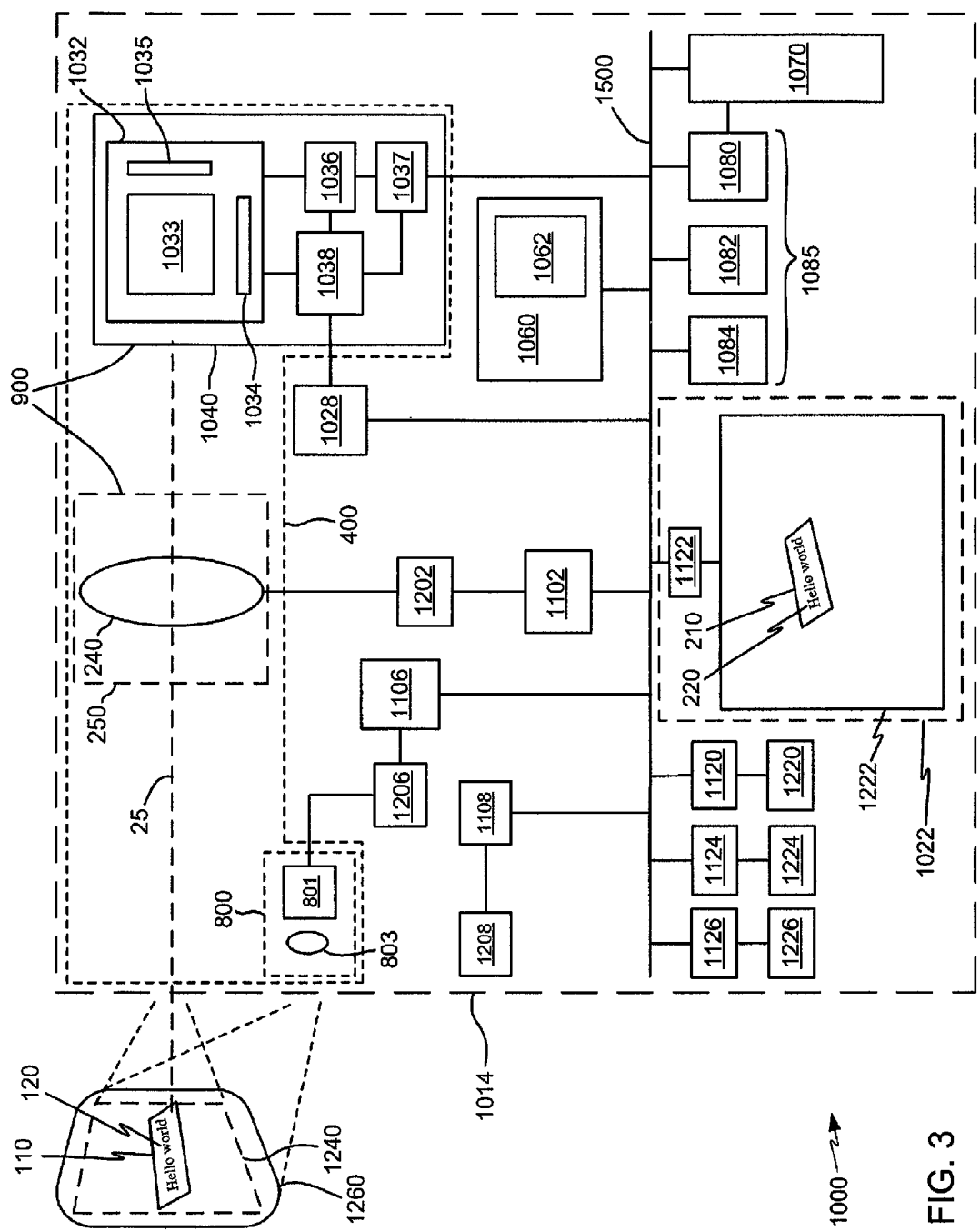
FIG. 3 depicts a schematic block diagram of a digital device with an imaging subsystem, a stream parser, a decode subsystem, and a display subsystem, in accordance with an illustrative embodiment.

FIG. 2 and FIG. 3 depict more about the operation and elements of device 1000. FIG. 3 depicts a schematic block diagram of digital device 1000 with imaging subsystem 400, a stream parser 1070, a decode subsystem 1062, and a display subsystem 1022 that includes display screen 1222, in accordance with an illustrative embodiment. Further detail on FIG. 3 is provided further below, after introducing selected elements thereof in relation to FIGS. 1 and 2. FIG. 2 depicts a flowchart 200 for executable instructions for processing elements including a stream parser 1070 in digital device 1000, in accordance with an illustrative embodiment. Rendering frames of image data on display screen 1222 and otherwise processing the frames of image data by the display subsystem 1022, and performing attempted decodes of decodeable features in frames of image data by the decode subsystem 1062, can both be demanding processing tasks that impose substantial processing burdens on the processing elements used for these tasks. Flowchart 200 shows an overview of a system implemented and embodied by device 1000 for managing the distribution of frames of image data to the display subsystem 1022 and the decode subsystem 1062. This system may be implemented with a software download to device 1000 and that may be implemented, in different formats or builds, by any of a wide variety of computing devices and other digital devices.

As shown in FIG. 2 and with reference to elements shown in FIGS. 1 and 3, this system for managing the distribution of the image data frames includes an imaging subsystem 400 that acquires frames of image data, as at block 501; a stream parser 1070 that assigns each of the incoming frames of image data being acquired by imaging subsystem 400 to either the display subsystem 1022 or the decode subsystem 1062, as at block 503; decode subsystem 1062 performing attempted decodes of decodeable features in frames of image data, as at block 511; and display subsystem 1022 rendering frames of image data on the display screen 1222, as at block 521.

Substantial advantages in processing speed and efficiency are gained by stream parser 1070 assigning each of the incoming frames of image data either to display subsystem 1022 or to decode subsystem 1062, but not assigning any of the individual frames of data to both, so that none of the frames of data are assigned to both the display subsystem 1022 and the decode subsystem 1062. Assigning the data to either one or the other provides processing advantageous over an alternative of shuttling individual frames of image data through both a display subsystem and a decode subsystem. The rate of acquisition of frames of image data by device 1000 is high enough, relative to the rate at which frames of image data can be usefully rendered and analyzed by display subsystem 1022 and usefully processed for attempted decodes by decode subsystem 1062, that there is little or no significant or noticeable loss of performance in the functions of either one, in various illustrative embodiments.

For stream parser 1070 to assign frames of image data to the display subsystem 1022 or the decode subsystem 1062 may involve the stream parser 1070 itself sending the frames of image data to the display subsystem 1022 or the decode subsystem 1062, or may involve the stream parser 1070 instructing one or more other processing elements or interfaces to send each frame of image data to display subsystem 1022 or decode subsystem 1062, in different embodiments.

Stream parser 1070 may include any of a variety of hardware and/or software elements, and may parse the incoming stream of image data frames according to any of a wide variety of criteria or protocols, in various embodiments. For example, in one illustrative embodiment, stream parser 1070 may be a simple hardware relay that alternates sending every other frame of image data to display subsystem 1022 and every other alternate frame of image data to decode subsystem 1062, or that divides an incoming stream of image data frames into groups of three and sends the first frame of each group to decode subsystem 1062 and the next two frames to display subsystem 1022, for example. In other illustrative examples, stream parser 1070 may divide an incoming stream of image data frames into groups of five and send the first frame of each group to decode subsystem 1062 and the next four frames to display subsystem 1022, or into groups of thirteen and send the first three frames of each group to decode subsystem 1062 and the next ten frames to display subsystem 1022, for example. In general in some embodiments, the processing burden may be higher for the decode subsystem 1062 so that it is more advantageous to send a majority of the frames of image data to display subsystem 1022, in these particular illustrative embodiments.

For example, in an illustrative embodiment, imaging subsystem 400 may acquire frames of image data at a rate of around 60 to 70 frames per second, but which may depend on illumination and other factors, for example; decode subsystem 1062 may be able to process a maximum of, for example, three frames at the same time, and around 20 or 24 frames per second, for example, for analyzing the image data frames for decodeable features and performing attempted decodes on the decodeable features; and display subsystem 1022 may be operative for displaying a maximum frame rate of, for example, 25 frames per second, and a higher frame rate in the display may be beyond the capability of human vision to notice any difference anyway, in an illustrative embodiment.

In many embodiments there may be greater advantages obtained by incorporating more sophisticated stream parsing processes, which may be implemented in software and/or hardware, for assigning the image data frames to either the display subsystem 1022 and/or decode subsystem 1062. These stream parsing processes may also be advantageously improved using feedback provided from display subsystem 1022 and/or decode subsystem 1062 back to stream parser 1070, in various embodiments. This is also shown in the illustrative embodiment of flowchart 200 in FIG. 2, as in block 513, which shows that decode subsystem 1062 may provide information to stream parser 1070 on, for example, available processing power for performing attempted decodes, or successful decodes of decodeable features, in this illustrative embodiment. Additionally, as block 523 shows, display subsystem 1022 may provide information to stream parser 1070 on the frame rate being used for display screen 1222, and image quality characteristics such as exposure, blur, jitter, the size of decodeable features relative to the imaging resolution, or the position of decodeable features relative to the edges of the field of view, for example. Stream parser 1070 may use feedback such as these illustrative examples from display subsystem 1022 and/or decode subsystem 1062 in determining how to parse the ongoing stream of image data frames between the display subsystem 1022 and decode subsystem 1062, in this illustrative embodiment.

Looking in more detail at how these various components are related in illustrative device 1000, FIG. 3 shows various elements of device 1000 as an exemplary hardware platform for support of operations described herein. Device 1000 may include lens assembly 250 which may be adapted for focusing an image of the target 110 located within a field of view 1240, onto image sensor array 1033. Field of view 1240 of device 1000 and image sensor array 1033 can be defined by lens assembly 250 in combination with image sensor array 1033.

Image sensor 1032 may include multiple pixel image sensor array 1033 having pixels arranged in rows and columns of pixels, associated column circuitry 1034 and row circuitry 1035. Associated with the image sensor 1032 may be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 may be packaged into a common image sensor integrated circuit 1040, in this illustrative embodiment. Image sensor integrated circuit 1040 may incorporate fewer than the noted number of components, in various embodiments.

In one illustrative example, image sensor integrated circuit 1040 can be provided e.g., by an MT9V022 (752×480 pixel array) or an MT9V023 (752×480 pixel array) image sensor integrated circuit available from MICRON TECHNOLOGY, INC. In one illustrative example, image sensor integrated circuit 1040 can be provided by an AV2105 2 Megapixel Color (1600×1200 pixel array) available from ARECONT VISION. In one illustrative example, image sensor integrated circuit 1040 can be provided by an MTD001C12STC 2 megapixel color (1600×1200 pixel array) available from MICRON TECHNOLOGY, INC.

In one illustrative example, image sensor integrated circuit 1040 can incorporate a Bayer pattern filter, so that defined at the image sensor array are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an illustrative embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. In another illustrative embodiment, processor 1060 may, prior to subjecting a frame for further processing, interpolate pixel values intermediate of red pixel positions utilizing red pixel values for development of a monochrome frame of image data. In another illustrative embodiment, processor 1060 may, prior to subjecting a frame for further processing, interpolate pixel values intermediate of blue pixel positions utilizing blue pixel values.

In the course of operation of device 1000, image signals can be read out of image sensor 1032, converted, and stored into a system memory such as RAM 1080. Mobile device 1000 may include one or more memory components 1085, which may illustratively include RAM 1080, a nonvolatile memory such as EPROM 1082, a memory storage device 1084, and any of a variety of other types of memory components, in various embodiments. Memory storage device 1084 may illustratively be or include a flash memory, a hard disc drive, any type of RAM, EPROM, EEPROM, DVD-ROM, CD-ROM, or other type of ROM, optical disc, magnetic disc, magnetic cassette, magnetic tape, or any other type of volatile or non-volatile or removable or non-removable memory or data storage components, in illustrative embodiments.

In various illustrative embodiments, device 1000 may include processor 1060 which can be adapted to read out image data stored in memory 1080 and subject such image data to various image processing algorithms. For example, one or more processors such as processor 1060 may illustratively be or include a central processing unit (CPU), a complex programmable logic device (CPLD), an application-specific integrated circuit (ASIC), a field programmable gate array (FPGA), a graphics processing unit (GPU), or any type of circuit capable of processing logic operations, in various embodiments.

Device 1000 also includes a system bus 1500 providing for bus arbitration, that may include any of a variety of bus structures such as a memory bus or memory controller, a peripheral bus, or a local bus, using any of a variety of architectures, in various illustrative embodiments. For example, this may include a Peripheral Component Interconnect (PCI) or Mezzanine bus, an Industry Standard Architecture (ISA) bus, an Enhanced Industry Standard Architecture (EISA) bus, a Micro Channel Architecture (MCA) bus, a Video Electronics Standards Association (VESA) bus, or other bus architectures, in various embodiments.

Device 1000 also includes stream parser 1070 in this illustrative embodiment. Stream parser 1070 may include a direct memory access unit (DMA) or other type of processing element, for example. Stream parser 1070 may route image information read out from image sensor 1032 that has been subject to conversion to RAM 1080, in various embodiments. Other embodiments of the system bus architecture and/or direct memory access components providing for efficient data transfer between the image sensor 1032 and RAM 1080 may be encompassed in various embodiments. In other embodiments, a stream parser may include or involve processor 1060, other processors, a separate direct memory access unit, and/or functions performed by any of these hardware elements, for example. Different implementations of a stream parser may include or involve any one or more hardware elements and/or software elements, in different embodiments.

Device 1000 may include an illumination subsystem 800 for illumination of a target area such as target 110 and projection of an illumination pattern 1260, in various embodiments. Other relevant devices may also be devoid of illumination subsystem 800, in various embodiments. Illumination pattern 1260, in the embodiment shown in FIGS. 1 and 3, can be projected to be proximate to but larger than an area defined by field of view 1240, but can also be projected in an area smaller than an area defined by a field of view 1240, for example.

In various embodiments, illumination subsystem 800 may also include an illumination lens assembly 803, as is shown in the embodiment of FIG. 3. In addition to or in place of illumination lens assembly 803, illumination subsystem 800 may include alternative light shaping optics, e.g., one or more diffusers, mirrors, and prisms. In use, device 1000 can be oriented by an operator with respect to a target area containing target 110 bearing decodable feature 120 in such manner that illumination pattern 1260 is projected on a decodable feature 120. Decodable feature 120 may include any type of characters, symbols, or other visually detectable features that are susceptible of being decoded. This may include characters and/or numerals that may be decoded by any of various optical character recognition (OCR) techniques, or a 1D or 2D barcode symbol, as illustrative examples.

Referring to further aspects of device 1000, lens assembly 250 may be controlled with use of electrical power input unit 1202. In one embodiment, an electrical power input unit 1202 may operate as a controlled voltage source, and in another embodiment, as a controlled current source. Illumination pattern light source assembly 801 may be controlled with use of light source control circuit 1206. Light source control circuit 1206 may send signals to illumination pattern light source assembly 801, e.g., for changing a level of illumination output by illumination pattern light source assembly 801. Certain elements of device 1000, e.g., image sensor integrated circuit 1040 (and image sensor array 1033), imaging lens 240, and illumination subsystem 800 may be packaged into an imaging module 400 which may be incorporated into hand held housing 1014. In other embodiments, a device may not have an illumination subsystem.

Device 1000 may include a number of peripheral devices, illustratively including a trigger 1220 (depicted in block diagram form in FIG. 3) which may be used to make active a trigger signal for activating frame readout and/or certain decoding processes, in this illustrative embodiment. Mobile device 1000 may be adapted so that activation of trigger 1220 activates a trigger signal and initiates a decode attempt. Specifically, device 1000 may be operative so that in response to activation of a trigger signal, a succession of frames may be captured by way of read out of image information from image sensor array 1033 (typically in the form of analog signals) and then storage of the image information after conversion into memory 1080 (which may buffer one or more of the succession of frames at a given time). Input mechanism 1224, another key on housing 1014, or a virtual button or widget on display screen 1222 may be assigned to function as a trigger for a user to initiate this trigger signal, in various illustrative embodiments. Processor 1060, and for example a processing element or software module running on processor 1060 and serving as decode subsystem 1062, may be operational to subject one or more of the succession of frames of image data to an attempted decode of one or more decodeable features in the image data frames.

Decode subsystem 1062 may be included as part of processor 1060, in the illustrative embodiment of FIG. 3. Decode subsystem 1062 may involve one or more firmware elements, and/or software modules running on processor 1060, and/or may involve one or more specialized hardware elements on processor 1060. In other illustrative elements, decode subsystem 1062 may include one or more separate processors or other hardware and/or software elements.

For attempting to decode a decodeable feature, such as a set of written characters or a one or two dimensional barcode, or other symbol or symbols in an illustrative embodiment, decode subsystem 1062 of device 1000 can process image data of a frame corresponding to a set of pixel positions (e.g., a row, a column, a diagonal set, a plane, etc. of pixel positions) to determine a spatial pattern of dark and light cells and can convert each light and dark cell pattern determined into a character or character string, such as by using optical character recognition (OCR), other pattern recognition or machine learning methods, table lookup, or other means. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string, for example.

Device 1000 may include various interface circuits for coupling various of the peripheral devices to system address/data bus (system bus) 1500, for communication with processor 1060 and decode subsystem 1062 also coupled to system bus 1500. Device 1000 may include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500.

Device 1000 also includes display subsystem 1022, which includes display interface 1122, and display screen 1222 coupled to system bus 1500 via display interface 1122 and thereby in communication with processor 1060 and decode subsystem 1062.

Input mechanism 1224 is also in communication with processor 1060 via input mechanism interface 1124 connected to system bus 1500. Input mechanism 1224 may be an optical trackpad, a touchpad, a trackball, a function button, or any other type of input mechanism. Mobile device 1000 may also include keyboard 1226 coupled to system bus 1500. Keyboard 1226 may be in communication with processor 1060 via keyboard interface 1126 connected to system bus 1500. Keyboard 1226 may be a slide-out keyboard, or a virtual keyboard that may be rendered on display screen 1222. Other embodiments may have a physical keyboard or keypad on the front surface thereof (not depicted in FIG. 1). Device 1000 may also include range detector unit 1208 coupled to system bus 1500 via interface 1108. Various embodiments may include any of an aimer, a light level sensor, an accelerometer, a compass, a GPS sensor, and/or other input components.

Device 1000 may capture frames of image data at a rate known as a frame rate. In one illustrative implementation, the frame rate may be 60 frames per second (FPS) which translates to a frame time (frame period) of 16.6 ms. In another illustrative implementation, the frame rate may be 30 frames per second (FPS) which translates to a frame time (frame period) of 33.3 ms per frame. A frame rate of device 1000 may be increased (and frame time decreased) by decreasing of a frame picture size. An illustrative embodiment may use an AV2105 image sensor integrated circuit, in which a maximum resolution picture size (1600×1200) may be selected which may yield a frame rate of 24 FPS. Selection of an HDTV windowed picture size (1280×1024) may yield a frame rate of 32 FPS. Using an MT9D001C12 STC image sensor integrated circuit, a maximum resolution picture size (1600×1200) may be selected which can yield a frame rate of 20 FPS. Selection of an SXGA windowed picture size may yield a frame rate of 28 FPS. The frame rate for capturing image data frames may also be dynamic, and may vary based on illumination or ambient light levels and exposure times, for example. The incoming preview frame rate may be analyzed, and if the frame rate drops below a certain threshold then the camera's illumination subsystem 800, which may include one or more LED lamps for example, can be automatically energized.

In various embodiments, an image signal processing driver or application may be incorporated in mobile device 1000. The image signal processing driver may direct the process of loading frames of image data from the image sensor array 1033 to a buffer memory component such as RAM 1080 to be available to stream parser 1070, prior to stream parser 1070 assigning the image data frames to either decode subsystem 1062 or display subsystem 1022. In an illustrative embodiment, mobile device 1000 can incorporate a version of Direct-Show Media Management software from MICROSOFT Corporation of Redmond, Wash., which may be involved in directing the process of loading the image data frames from the image sensor array 1033 to the buffer such as RAM 1080. In various other embodiments, mobile device 1000 can incorporate another video driver or other image signal driver.

Once a decode of a decodeable feature into a decoded message, for example, is successfully performed, it may be presented to the user, and the user may take further steps such as saving or transmitting the message to a local or remote data storage element or other destination, by any of various means and in any of various formats. This may be done by user input to display screen 1222, input mechanism 1224, or other input element. For example, the message may be stored to storage memory 1084 of device 1000, which may comprise a flash memory or a hard disc drive, for example.

In various illustrative embodiments, device 1000 may be operative so that display screen 1222 renders a streaming video output or other series of image frames, showing a real-time portion of the portion of image frames being imaged by the camera or imaging subsystem 400 that are assigned by stream parser 1070 to display subsystem 1022. The video output may serve a variety of useful purposes in promoting successful decode of a decodeable feature being imaged with imaging subsystem 400. For example, an illustrative implementation may allow a user to see a streaming video playback showing how target 110 is being imaged by device 1000, and showing when target document 110 is relatively flat, well-lit, and encompassed within the field of view 1240 of the imaging subsystem 400.

The frames of image data assigned to the preview video stream rendered on display screen 1222, and/or the frames of image data assigned to the decode subsystem, may have their resolution reduced and a corresponding reduction in the amount of data in each frame compared with a higher resolution frame on which it is based. This may enable a reduced processing burden and a reduced duration of time for processing for either rendering the frames on display screen 1222 and/or processing the frames of image data for attempted decodes, in different embodiments. Whether this is advantageous in a given embodiment may depend on available processing power and other hardware and software constraints.

Figure 4:
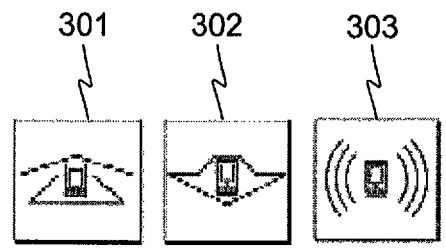
FIG. 4 depicts user guidance icons for an imaging application graphical user interface, in accordance with an illustrative embodiment.

FIG. 4 depicts user guidance icons 301, 302, 303 for an imaging application graphical user interface, such as may be rendered on display screen 1222 of device 1000, in accordance with an illustrative embodiment. User guidance icon 301 indicates to a user to move device 1000 closer toward a target decodeable feature. This may be provided for example if device 1000 detects the presence of decodeable features but detects that they are relatively small in the field of view and the imaging resolution is a limiting factor constraining the attempted decodes, for example. User guidance icon 302 indicates to a user to move device 1000 farther away from a target decodeable feature. This may be provided for example if device 1000 detects the presence of decodeable features but detects that the decodeable features extend outside the field of view 1240 and are cut off by the edge of the field of view 1240, for example. User guidance icon 303 indicates to a user that excessive motions of device 1000 are interfering with imaging, and that device 1000 should be held still. This may be provided if device 1000 detects jitter or lack of sharpness in the decodeable features, or excessive differences from one frame of image data to the next. In various illustrative embodiments, jitter may also be detected by an accelerometer (not depicted) incorporated in device 1000 and provided to other processing elements such as display subsystem 1028, stream parser 1070, and/or decode subsystem 1062.

Display subsystem 1022 analyzing image data frames for excessive motion may involve, for example, comparing groups of pixel blocks from a current preview image to the previous one, and taking a change in any of the total red, green or blue values of the pixel groups have changed by more than a specified amount, for example. The motion check may, for example, compare groups of pixels from the current preview image to the previous one. If any of the total red, green or blue values of the pixel groups have changed by more than a specified amount, then the guidance icon 303 may be shown on the display screen 1222, in this illustrative embodiment.

Display subsystem 1028 of device 1000 can be operative to depict any of the user guidance icons shown in FIG. 4, in addition to other potential user guidance icons that may be used in various embodiments. As other examples, additional user guidance icons may include icons with straight or curving arrows to prompt a user to move device 1000 in any one of various indicated straight or rotational directions, among various additional user guidance icons that may be useful in different embodiments for guiding a user to improve the conditions for various image quality characteristics in the frames of image data acquired by imaging subsystem 400. A variety of user guidance icons may be used to guide the user to take many types of actions to improve imaging quality for document capture. In various embodiments, user guidance icons or prompts may take or be accompanied by any user-perceptible form, illustratively including sounds or audio outputs, tactile outputs, or any type of graphical or other visual outputs, and may include any combination of outputs. Failures in the quality imaging criteria may be aggregated over a specified time period so that the operator is not presented with rapidly-changing instructions.

Display subsystem 1022 may be the component of device 1000 that evaluates the frames of image data, and in particular only frames of image data that are assigned to display subsystem 1022 by stream parser 1070, for various image quality characteristics. Poor resolution, cut-off by the edge of the field of view, and jitter or lack of sharpness, are among various image quality characteristics that may be correctable by the user and that may be improved by providing user guidance icons to indicate to the user how to operate device 1000 to improve imaging quality and enhance the likelihood of successful decodes. Display subsystem 1022 may perform both the evaluation of these image quality characteristics and then display any of various user guidance icons on display screen 1222, and/or communicate information back to stream parser 1070 or to decode subsystem 1062, for example regarding problematic image quality characteristics that may be improved automatically by device 1000.

For example, display subsystem 1022 may evaluate image quality characteristics such as exposure or focus. If the image is underexposed or overexposed, display subsystem 1022 may provide feedback to change the exposure time of the frames and/or to begin using or stop using or alter the level of illumination from illumination subsystem 800. If the focus is bad, the display subsystem 1022 may provide feedback to automatically focus the imaging subsystem on the imaging target. Lens focus may be set according to an estimated distance from the terminal 1000 to the imaging target, which may be assisted by range detector unit 1208, for example, or may use an autofocus mode instead. Various of these functions of display subsystem 1022 may be performed by display interface 1122, for example, which may perform significant independent processing functions. In various implementations, display interface 1122 may include a graphics processing unit (GPU) or other specialized form of display processing element, for example.

If poor image quality characteristics are detected, and relayed by the display subsystem 1022 back to the stream parser 1070, the stream parser 1070 may also decide to send the next several image data frames all to the display subsystem 1022, potentially until the display subsystem 1022 reports back that the image quality characteristics have improved, since these image data frames with poor image quality characteristics are less likely to result in a successful decode of any decodeable features therein.

Stream parser 1070 may also receive feedback from decode subsystem 1062 that it is working at its full processing capability at attempted decodes on one or several image data frames, and stream parser 1070 may then assign all incoming image data frames to display subsystem 1062 until decode subsystem 1062 reports back to stream parser 1070 that it once again has available processing capability to run attempted decodes on a new image data frame, in an illustrative embodiment. Decode subsystem 1062 may also report back to stream parser 1070 when it achieves a successful decode of a decodeable feature, which stream parser 1070 may respond to with some other step, such as assigning all subsequent incoming image data frames to display subsystem 1062, for example, until a subsequent signal is received to begin imaging for new decodeable features. In another operational mode, stream parser 1070 may be set to continue assigning image data frames to decode subsystem 1062 for continuous decode attempts of multiple decodeable features in a long-running sequence of image data frames, until some outside instruction affirmatively ending the decode attempts is received.

The stream parser 1070 may also decide not to assign some image data frames to either decode subsystem 1062 or display subsystem 1022, but just to let them be written over by subsequent image data frames, for example if the image data frames are being generated by imaging subsystem 400 faster than they can be processed for decoding by decode subsystem 1062 or usefully displayed and analyzed by display subsystem 1022, in an illustrative embodiment. In such a case, stream parser 1070 may also report back to imaging subsystem 400 to reduce the rate of image acquisition, in this illustrative embodiment, which may make the operation of device 1000 more energy-efficient without any loss of performance to the operations of either decode subsystem 1062 or display subsystem 1022, in this illustrative embodiment.

In an illustrative embodiment, device 1000 can be operative so that device 1000 may be configured for any of several optional stream parsing modes, for different protocols for how the stream parser assigns image data frames, via menu selections and also by an XML based configuration file. The XML file may be edited using an appropriate editor of a software development kit that may be sold with mobile device 1000, offered for download on a website, or otherwise made available, in different illustrative embodiments. A configuration file can contain several sections, each of which can contain keys that define operational parameters for imaging and performing attempted decodes on decodeable features. Device 1000 can be operative so that different configuration options are displayed on a menu on display screen 1222. A user interface of mobile device 1000 may also be provided by configuring device 1000 to be operative to be reprogrammed by decoding of programming barcode symbols, that may be scanned and decoded by device 1000 where the decoded information is received as programming instructions for the device 1000.

FIG. 5 depicts a top plan view of a device 1000 with a display subsystem with an imaging application graphical user interface on display screen 1222, displaying a frame of image data from a stream of image data acquired with an imaging subsystem, where the image data shows rendering 210 of a target 110 and rendering 220 of the decodeable feature 120 on target 110. FIG. 5 also depicts the display screen 1222 showing illustrative user guidance icon 303 indicating to hold the device still. Display screen 1222 also shows information from the successful decode of decodeable feature 120, in the form of output text 320 displayed in text box 311 on display screen 1222, where output text 320 represents the decoded information from the decodeable feature 120. This information for output text 320 came from a different frame of image data that was assigned to the decode subsystem 1062 and not to the image data frames sent to display subsystem 1022 used to form the rendering 210 of the target 110 on display screen 1222. Output text 320 is very different from the image rendering 220 displayed on display screen 1222, where output text 320 is in the form of text provided by device 1000 based on the information generated by the successful decode of decodeable feature 120, and where that information may be stored, transmitted, or used as the text itself, rather than as an undecoded image.

An illustrative sample of devices, systems, apparatuses, or methods disclosed herein are as follows:

A1. A device comprising:

an imaging subsystem, capable of providing frames of image data representative of light incident on said imaging subsystem;

one or more memory components operative for temporarily storing the frames of image data;

a display subsystem comprising a display screen and operative for receiving frames of image data and rendering the frames of image data on the display screen;
a decode subsystem comprising one or more processors operative for receiving frames of image data and performing an attempted decode of a decodable feature represented in at least one of the frames of image data; and
a stream parser, in communicative connection with the one or more memory components, the display subsystem, and the decode subsystem, and operative for assigning a first set of the frames of image data to the display subsystem, and a second set of the frames of image data to the decode subsystem, wherein none of the frames of data are assigned to both the display subsystem and the decode subsystem.

A2. The device of A1, wherein a majority of the frames of image data are assigned to the display subsystem.

A3. The device of A1, wherein the stream parser assigns a pre-selected portion of the frames of image data to either the display subsystem or the decode subsystem.

A4. The device of A1, wherein the stream parser comprises a hardware component configured for assigning a pre-set proportion of the frames of image data to the display subsystem and the remaining frames of image data to the decode subsystem.

A5. The device of A1, wherein the stream parser receives information on a frame rate at which the display subsystem is capable of rendering the frames of image data, and assigns the frames of image data to either the display subsystem or the decode subsystem based at least in part on refraining from assigning frames of image data to the display subsystem at a faster rate than the frame rate at which the display subsystem is capable of rendering the frames of image data.

A6. The device of A1, wherein the stream parser receives feedback from the decode subsystem, and assigns new frames of image data to either the display subsystem or the decode subsystem based at least in part on the feedback from the decode subsystem.

A7. The device of A6, wherein the feedback from the decode subsystem comprises information on whether or not the decode subsystem currently has spare processing power available for performing an attempted decode on another frame of image data, and if a current frame of image data would have been assigned to the decode subsystem but the decode subsystem does not currently have spare processing power available for performing an attempted decode on another frame of image data, then assigning the current frame of image data to the display subsystem.

A8. The device of A6, wherein the feedback from the decode subsystem comprises information on how long the decode subsystem has been performing an attempted decode on one or more frames of data it is currently processing.

A9. The device of A1, further operative for analyzing one or more image quality characteristics, comprising at least one of jitter, exposure, and focus, in the frames of image data assigned to the display subsystem, and for providing an output to at least one of the display subsystem or the decode subsystem based on at least one of the image quality characteristics.

A10. The device of A9, further operative for evaluating whether at least one of the image quality characteristics is outside a selected image quality threshold, and if at least one of the image quality characteristics in a first frame of image data assigned to the display subsystem is outside the selected image quality threshold and a second frame of image data immediately subsequent to the first frame would have been assigned to the decode subsystem, then assigning the second frame of image data to the display subsystem.

A11. The device of A10, further operative for providing a user guidance icon with the second frame of image data, wherein the user guidance icon comprises information useful for improving at least one of the image quality characteristics that was outside the selected image quality threshold in the first frame of image data.

A12. The device of A11, wherein the user guidance icon comprises crop marks superimposed on the rendering of the frames of image data on the display screen.

A13. The device of A12, wherein the crop marks are selected from among a crop mark that indicates that the device should be held still; a crop mark that indicates that the device should be moved closer to a target; a crop mark that indicates that the device should be moved farther away from a target; and a crop mark that indicates that the device should be moved in a sideways direction relative to the target.

A14. The device of A1, wherein the decode subsystem comprises processing capability for performing simultaneous attempted decodes on a maximum number of the frames of image data, and the stream parser is operative for first assigning frames of image data to the decode subsystem until the maximum number of frames the decode subsystem has the processing capability for performing simultaneous attempted decodes on has been assigned, and then assigning all subsequent frames of image data to the display subsystem until either the decode subsystem has spare processing capability for performing a decode attempt on another frame of image data, or the decode subsystem successfully decodes a decodable feature.

A15. A computer-readable storage medium comprising executable instructions operative for enabling one or more processing elements for:
assigning frames of image data from a stream of image data to either a display subsystem or a decode subsystem;
wherein the display subsystem is operative for rendering the frames of image data on a display screen;
wherein the decode subsystem is operative for receiving frames of image data and performing an attempted decode of a decodable feature represented in at least one of the frames of image data; and
wherein none of the frames of data are assigned to both the display subsystem and the decode subsystem.

A16. The computer-readable storage medium of A15, wherein a majority of the frames of image data are assigned to the display subsystem.

A17. The computer-readable storage medium of A15, further comprising receiving information on a frame rate at which the display subsystem is capable of rendering the frames of image data, and assigning the frames of image data to either the display subsystem or the decode subsystem based at least in part on refraining from assigning frames of image data to the display subsystem at a faster rate than the frame rate at which the display subsystem is capable of rendering the frames of image data.

A18. The computer-readable storage medium of A15, further comprising receiving feedback from the decode subsystem on whether or not the decode subsystem currently has spare processing power available for performing an attempted decode on another frame of image data, and if a current frame of image data would have been assigned to the decode subsystem but the decode subsystem does not currently have spare processing power available for performing an attempted decode on another frame of image data, then assigning the current frame of image data to the display subsystem.

A19. The computer-readable storage medium of A15, further comprising evaluating whether at least one image quality characteristic selected from among jitter, exposure, and focus, in a first frame of image data assigned to the display subsystem is outside a selected image quality threshold, and if so, then assigning an immediately subsequent series of frames of image data to the display subsystem together with a user guidance icon comprising information useful for improving at least one of the image quality characteristics that was outside the selected image quality threshold in the first frame of image data.

A20. The computer-readable storage medium of A15, further comprising first assigning frames of image data to the decode subsystem until a maximum number of frames the decode subsystem has the processing capability for performing simultaneous attempted decodes on has been assigned, and then assigning all subsequent frames of image data to the display subsystem until either the decode subsystem has spare processing capability for performing a decode attempt on another frame of image data, or the decode subsystem successfully decodes a decodable feature.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. For example, while various illustrative embodiments of a stream parser, a decode subsystem, and a display subsystem are disclosed, it will be well understood by those skilled in the relevant field that some or all the processing functions of each of these elements may be performed by a single processing element, or any number of processing elements, running software that may be included in a single software package or distributed among multiple software modules, programs, libraries, applications, protocols, or other units. Also, while a number of particular embodiments have been described, it will be understood that features and aspects that have been described with reference to each particular embodiment can be used with each remaining particularly described embodiment.

What is claimed is:

1. A device comprising:
    an imaging subsystem, capable of providing frames of image data representative of light incident on said imaging subsystem;
    one or more memory components operative for temporarily storing the frames of image data;
    a display subsystem comprising a display screen and operative for receiving frames of image data and rendering the frames of image data on the display screen;
    a decode subsystem comprising one or more processors operative for receiving frames of image data and performing an attempted decode of a decodable feature represented in at least one of the frames of image data; and
    a stream parser, in communicative connection with the one or more memory components, the display subsystem, and the decode subsystem, and operative for assigning a first set of the frames of image data to the display subsystem, and a second set of the frames of image data to the decode subsystem, wherein none of the frames of data are assigned to both the display subsystem and the decode subsystem;
    wherein the stream parser assigns a pre-selected portion of the frames of image data to either the display subsystem or the decode subsystem.

2. The device of claim 1, wherein a majority of the frames of image data are assigned to the display subsystem.

3. The device of claim 1, wherein the stream parser comprises a hardware component configured for assigning a preset proportion of the frames of image data to the display subsystem and the remaining frames of image data to the decode subsystem.

4. The device of claim 1, wherein the stream parser receives information on a frame rate at which the display subsystem is capable of rendering the frames of image data, and assigns the frames of image data to either the display subsystem or the decode subsystem based at least in part on refraining from assigning frames of image data to the display subsystem at a faster rate than the frame rate at which the display subsystem is capable of rendering the frames of image data.

5. The device of claim 1, wherein the stream parser receives feedback from the decode subsystem, and assigns new frames of image data to either the display subsystem or the decode subsystem based at least in part on the feedback from the decode subsystem.

6. The device of claim 5, wherein the feedback from the decode subsystem comprises information on whether or not the decode subsystem currently has spare processing power available for performing an attempted decode on another frame of image data, and if a current frame of image data would have been assigned to the decode subsystem but the decode subsystem does not currently have spare processing power available for performing an attempted decode on another frame of image data, then assigning the current frame of image data to the display subsystem.

7. The device of claim 5, wherein the feedback from the decode subsystem comprises information on how long the decode subsystem has been performing an attempted decode on one or more frames of data it is currently processing.

8. The device of claim 1, further operative for analyzing one or more image quality characteristics, comprising at least one of jitter, exposure, and focus, in the frames of image data assigned to the display subsystem, and for providing an output to at least one of the display subsystem or the decode subsystem based on at least one of the image quality characteristics.

9. The device of claim 8, further operative for evaluating whether at least one of the image quality characteristics is outside a selected image quality threshold, and if at least one of the image quality characteristics in a first frame of image data assigned to the display subsystem is outside the selected image quality threshold and a second frame of image data immediately subsequent to the first frame would have been assigned to the decode subsystem, then assigning the second frame of image data to the display subsystem.

10. The device of claim 9, further operative for providing a user guidance icon with the second frame of image data, wherein the user guidance icon comprises information useful for improving at least one of the image quality characteristics that was outside the selected image quality threshold in the first frame of image data.

11. The device of claim 10, wherein the user guidance icon comprises crop marks superimposed on the rendering of the frames of image data on the display screen.

12. The device of claim 11, wherein the crop marks are selected from among a crop mark that indicates that the device should be held still; a crop mark that indicates that the device should be moved closer to a target; a crop mark that indicates that the device should be moved farther away from a target; and a crop mark that indicates that the device should be moved in a sideways direction relative to the target.

13. The device of claim 1, wherein the decode subsystem comprises processing capability for performing simultaneous attempted decodes on a maximum number of the frames of image data, and the stream parser is operative for first assigning frames of image data to the decode subsystem until the maximum number of frames the decode subsystem has the processing capability for performing simultaneous attempted decodes on has been assigned, and then assigning all subsequent frames of image data to the display subsystem until either the decode subsystem has spare processing capability for performing a decode attempt on another frame of image data, or the decode subsystem successfully decodes a decodable feature.

14. A method, comprising:
assigning, with a processing element, frames of image data from a stream of image data to either a display subsystem or a decode subsystem;
wherein the display subsystem is operative for rendering the frames of image data on a display screen;
wherein the decode subsystem is operative for receiving frames of image data and performing an attempted decode of a decodable feature represented in at least one of the frames of image data;
wherein none of the frames of data are assigned to both the display subsystem and the decode subsystem; and
wherein a pre-selected portion of the frames of image data are assigned to either the display subsystem or the decode subsystem.

15. The method of claim 14, wherein a majority of the frames of image data are assigned to the display subsystem.

16. The method of claim 14, comprising receiving information on a frame rate at which the display subsystem is capable of rendering the frames of image data, and assigning the frames of image data to either the display subsystem or the decode subsystem based at least in part on refraining from assigning frames of image data to the display subsystem at a faster rate than the frame rate at which the display subsystem is capable of rendering the frames of image data.

17. The method of claim 14, comprising receiving feedback from the decode subsystem on whether or not the decode subsystem currently has spare processing power available for performing an attempted decode on another frame of image data, and if a current frame of image data would have been assigned to the decode subsystem but the decode subsystem does not currently have spare processing power available for performing an attempted decode on another frame of image data, then assigning the current frame of image data to the display subsystem.

18. The method of claim 14, comprising evaluating whether at least one image quality characteristic selected from among jitter, exposure, and focus, in a first frame of image data assigned to the display subsystem is outside a selected image quality threshold, and if so, then assigning an immediately subsequent series of frames of image data to the display subsystem together with a user guidance icon comprising information useful for improving at least one of the image quality characteristics that was outside the selected image quality threshold in the first frame of image data.

19. The method of claim 14, comprising first assigning frames of image data to the decode subsystem until a maximum number of frames the decode subsystem has the processing capability for performing simultaneous attempted decodes on has been assigned, and then assigning all subsequent frames of image data to the display subsystem until either the decode subsystem has spare processing capability for performing a decode attempt on another frame of image data, or the decode subsystem successfully decodes a decodable feature.

* * * * *